United States Patent [19]

Leloux

[11] Patent Number: 4,534,184

[45] Date of Patent: Aug. 13, 1985

[54] DEVICE FOR COOLING MOLDS

[75] Inventor: Arnoldus W. J. Leloux, Dedemsvaart, Netherlands

[73] Assignee: Wavin B.V., Zwolle, Netherlands

[21] Appl. No.: 596,031

[22] Filed: Apr. 2, 1984

Related U.S. Application Data

[62] Division of Ser. No. 386,279, Jun. 8, 1982, Pat. No. 4,439,990.

[30] Foreign Application Priority Data

Jun. 11, 1981 [NL] Netherlands .................. 8102823

[51] Int. Cl.³ .............................................. F25D 17/02
[52] U.S. Cl. ......................................... 62/376; 62/64
[58] Field of Search ................... 62/63, 64, 373, 374, 62/375, 376

[56] References Cited

U.S. PATENT DOCUMENTS

| | | | |
|---|---|---|---|
| 1,102,769 | 7/1914 | Lincoln | 62/64 |
| 2,215,871 | 9/1940 | Fox | 62/64 |
| 2,717,319 | 9/1955 | Bundy | 62/64 |
| 3,405,531 | 10/1968 | Davis, Jr. et al. | 62/64 |
| 3,548,845 | 12/1970 | Ogi et al. | 62/64 |
| 3,590,904 | 7/1971 | Woodburn, Jr. | 62/64 |

Primary Examiner—Ronald C. Capossela
Attorney, Agent, or Firm—Wilkinson, Mawhinney & Theibault

[57] ABSTRACT

A method and device for cooling molds circulating in a horizontal plane, in which siphon action is used to pass cooling liquid from a top gutter through the molds. In this way the whole cooling system is becoming constructively simplified, such that production speeds can be increased, with the consequent greater length of the cooling system, but without its becoming unduly complicated. This effect is realized irrespective of the nature of the machine or the number of molds.

Method and device are especially advantageous when applied with the manufacture of plastics tube, more particularly yet with the manufacture of plastic corrugated tube.

7 Claims, 4 Drawing Figures

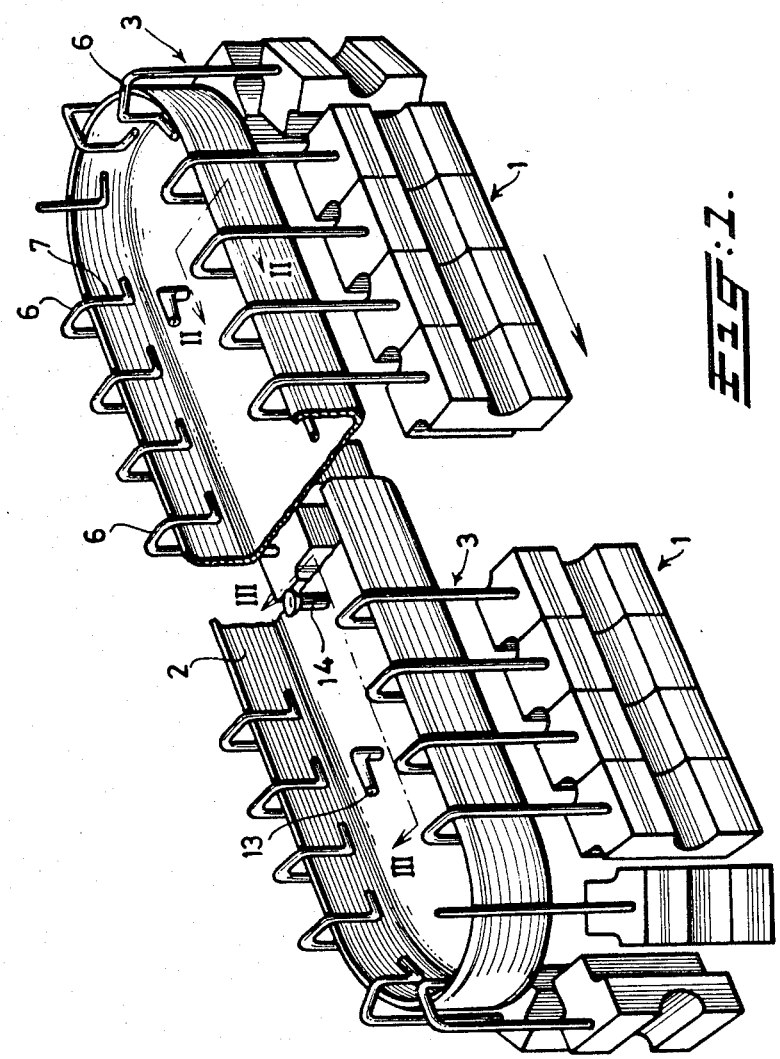

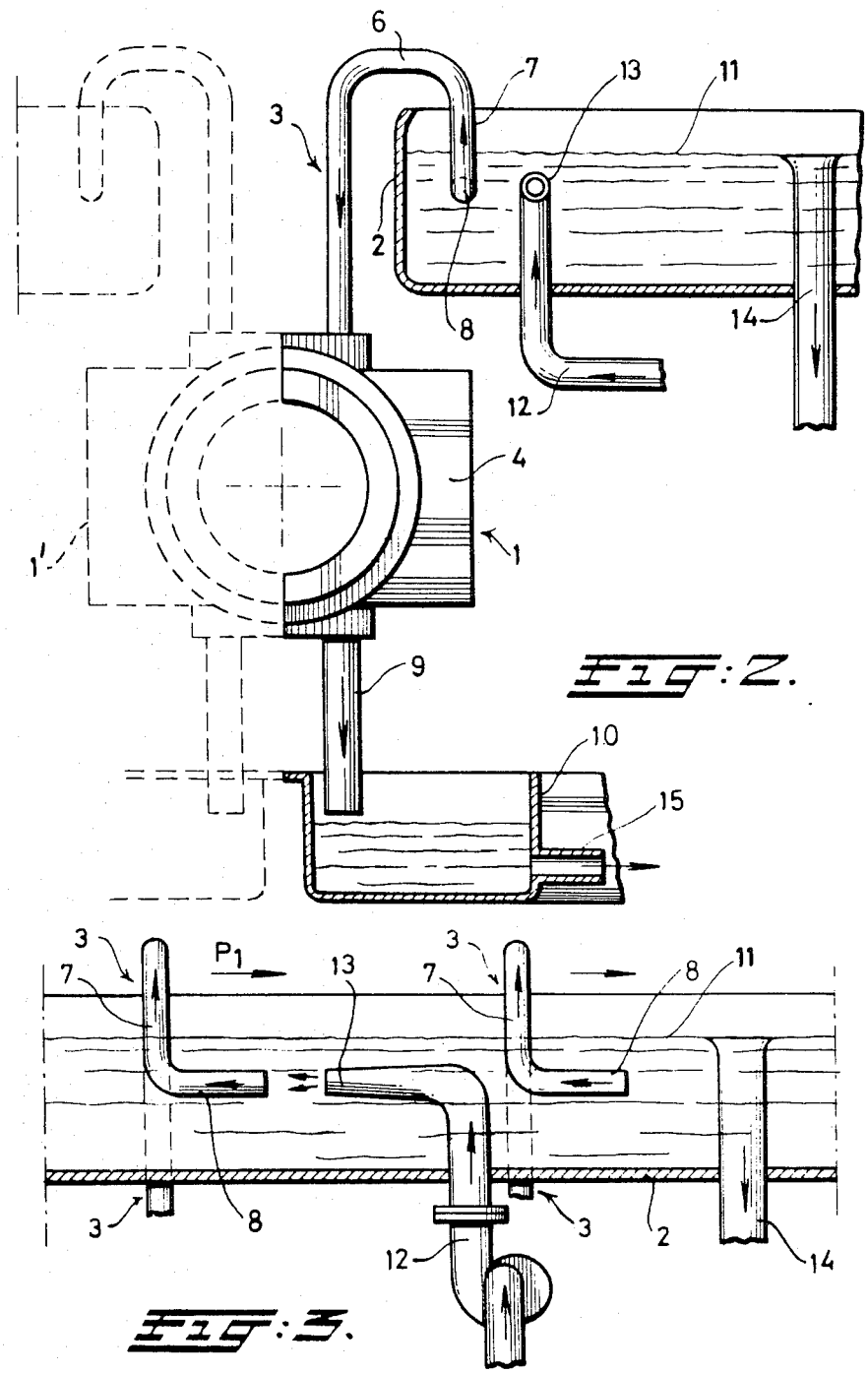

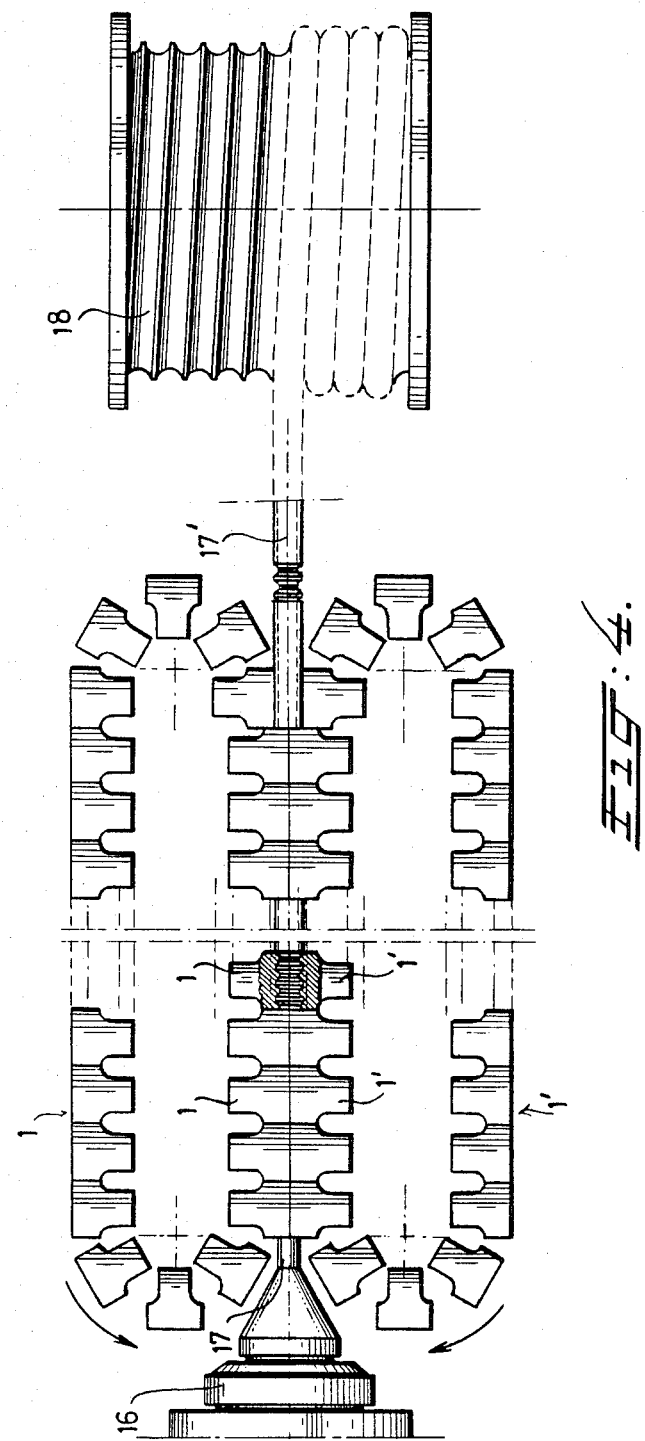

DEVICE FOR COOLING MOLDS

This application is a division of application Ser. No. 386,279, filed June 8, 1982, now U.S. Pat. No. 4,439,990.

BACKGROUND OF THE INVENTION

The invention relates to a method and a device for cooling molds, particularly molds circulating in a horizontal plane.

It is desirable to provide improved cooling technics for molds which are generally used in the industry, so that production speeds can be increased. In endeavors to increase the production speeds in various machines in a production line the cooling of the molds constitutes a particular problem. It is very difficult to influence the cooling time because it is determined to a very great extent by the process. A certain time is required to let a piece of work cool down to such a temperature that the product has obtained a fixed shape.

This means, amongst other things, that when increasing the production speed of a molding machine, the machine will have to become longer, in order to still obtain a sufficient cooling time. The consequence of this again is that the cooling system is becoming constructively complicated.

One particular field of application of this art is with cooling mold halves circulating in two loop-shaped paths having adjoining straight portions, such that the mold halves move along with a plastics tube coming from an extruder so as to shape said tube. Such shaping may include corrugating the tube.

OBJECTS OF THE INVENTION

One object of the invention is to provide a solution for the abovementioned problems in form of a cooling system which can be simply realized irrespective of the nature, extent or complicatedness of the machine or the number of molds in the machine.

Another object is to provide a method and a device by which a flow of cooling liquid will be automatically created and, once created, be maintained.

Another object is to automatically maintain a level of liquid in a supply gutter.

Another object is to be able to increase production speeds, without loss of quality, particularly in manufacturing plastics corrugated tubes.

SUMMARY OF THE INVENTION

In the method according to the invention, basically, siphon action is used to pass cooling liquid from a gutter or trough situated on top through the molds and is discharged to a collecting gutter situated therebelow.

This principle can be realized constructively in a very simple manner. Thus a device according to the invention distinguished itself in that, above the circulatory path of the molds and substantially parallel to said path, a supply gutter for cooling liquid is arranged, as well as below and also substantially parallel to said path a discharge gutter, and in that each mold is provided with a siphon tube at the top, connected with the internal cooling space, and being shaped such that the entrance ends pass over the edge of the supply gutter and below the level of the liquid which finds itself therein, there being provided, at the bottom of the mold, a discharge tube, the outflow end of which finds itself in or above the discharge gutter.

Thus there is simply made use of gravity to let the liquid flow through the mold.

In order to start the siphon action or to keep it going, respectively, it is advantageous when the entrance of the siphon tube is bent in horizontal direction. So use is made here of the dynamic pressure during displacement.

Furthermore the device can be realized such that the supply of cooling liquid to the supply gutter occurs by means of jet pipes which are directed opposite to the direction of being of the siphon tube and which are situated below the liquid level inside the gutter.

The features of the present invention which are believed to be novel are set forth with particularity in the appended claims.

Said claims and many of the attendant advantages will be more readily appreciated as the same becomes better understood with reference to the following detailed description and considered in connection with the accompanying drawings in which like reference symbols designate like parts throughout the figures.

DESCRIPTION OF THE DRAWINGS

FIG. 1 shows diagrammatically the arrangement of a device according to the invention relative to the path of displacement of the molds;

FIG. 2 is conceived of as a cross-sectional view according to the arrows II—II in FIG. 1;

FIG. 3 is conceived of as a cross-sectional view according to the arrows III—III in FIG. 1;

FIG. 4 is an overall view of manufacturing corrugated plastics tube.

DESCRIPTION OF THE PREFERRED EMBODIMENT

The idea of the invention is applicable to various molds, which are used for the manufacture of industrial products, in particular also with objects which are each formed individually. The invention will, however, be described with reference to an example of application in which mold halves 1 (see FIG. 1) are circulating in order to create, with similar other mold halves, the complete mold cavity. The object formed remains inside these mold halves until it has been cooled down sufficiently to maintain the shape obtained, at which moment the set of mold halves opens and goes back along the outermost part of the loop toward the beginning. FIG. 1 shows one such loop.

In FIG. 2 one mold half is visible; to the left in the same figure with broken lines, the corresponding other mold half 1' being illustrated. As far as in the present application there is referred to "molds" this also implies "mold halves" of this type which pairwise determine the final shape of the product.

Because the support and the drive of the molds as such does not constitute part of the inventive idea, there has been refrained from further illustration in the drawing or detailed description thereof.

As shown in FIGS. 2 and 3 molds 1 are moved horizontally relative to a stationary or static supply gutter or trough 2 containing cooling liquids. Each of the molds is provided with a siphon tube 3 which is connected with the internal space 4 of the mold which is adapted for the cooling. The siphon tube 3 may simply comprise a part 5 which extends straight upwardly, a part 6 which extends horizontally and subsequently part 7, which extends downwardly, the whole being of dimensions such that the siphon tube pases over the edge of the gutter 2. As will be further clarified with reference to FIG. 3, the inflow end of the siphon tube may comprise a part 8 which has been bent horizontally.

At the bottom the mold 1 is proved with a discharge tube 9 which can be short and simply straight and which debouches above or in a collecting or discharge gutter 10 for the cooling liquid which leaves the molds.

According to well known physical law a flow through the siphon tube 3, once created, will continue as long as the entrance end of the siphon tube finds itself below the liquid level 11 in the supply gutter 2. Both in order to decrease the risk of disturbances and in order to make the siphon process begin when starting the machine, the entrance end 8 of the siphon tube (FIG. 3) has been bent into the direction indicated in FIG. 3 by arrow P1. Furthermore, tubes 12 for supplying cooling liquid to the gutter 2 are provided with a bent end 13 which functions as a jet nozzle. This jet nozzle 13 points in the direction opposite to the direction of the inflow end 8 of the siphon tube, The jet nozzle 13 and the entrance end 8 of the siphon tube are, as a matter of course, not situated opposite one another, but in the lengthwise direction of the gutter at a certain lateral spacing as appears from FIGS. 1 and 3. The effect of the arrangement described of the jet nozzle 13 relative to the siphon inlet 18 is still, however, that at the entrance aperture of the siphon a hydrodynamic pressure is created which is sufficient to urge the liquid upwardly through the bend 7, 6, 5, by which pressure the siphon action will be created at any moment at which it is not already present.

It will be clear that there can be provided a plurality of supply tubes 12 with jet nozzle 13, depending on the overall dimensions of the gutter or the amount of liquid respectively, which is required for cooling the number of molds.

In the embodiment illustrated a discharge tube 14 is provided in the gutter 2, in form of an overflow, by which the liquid level 11 is determined. The circulation system for the liquid can then furthermore be realized such that the overflow 14 debouches somewhere in the collecting gutter 10. The water from this gutter 10 can be pumped away by a pump, not represented, via a discharge tube 15 and be supplied again, via a cooling installation, to the supply tube 13 for the upper gutter. The pump capacity can be dimensioned in such manner that it rotates continuously and has a yield which exceeds somewhat the total amount of cooling liquid which is being used by all molds connected with one supply gutter 2. All such liquid is fed, via the supplies 12, 13, to the gutter, whilst overflow 14, as stated, determines the level 11.

FIG. 4 diagrammatically shows the arrangement in a production line for manufacturing plastics corrugated tubes. The pairs of mold halves such as 1, 1' are circulating in two loops. The straight portion of the paths, where the mold halves co-operate, joins the extruder 16 which continuously produces smooth tube 17. The molds 1, 1' grant the tube a corrugation as is visible at the portion 17' which leaves the molds; the product obtained can then be wound on a reel 18.

What is claimed is:

1. A device for cooling plastic molds having vertical intake and discharge fluid tubes in communication with a coolant cavity in each mold, the molds being arranged for horizontal travel in a closed loop, the device comprising a static coolant reservoir positioned above the molds, and the fluid intake tube of each mold being shaped as a siphon tube and being positioned such that the entrance end thereof passes over the edge of the static reservoir and in communication with the coolant in said static reservoir, a static coolant collector positioned below the molds and in communication with the mold fluid discharge tubes, so that by siphon action coolant from the static coolant reservoir passes through the intake tubes, the molds and through the discharge tubes and is discharged in said static coolant collector.

2. A device as claimed in claim 1 wherein the entrance end of each fluid intake tube is bent in a direction opposite to the direction of travel of the mold intake fluid tubes.

3. A device according to claim 1 wherein the entrance end of the fluid intake tube is bent in a direction opposite to the direction of travel of the mold intake fluid tubes and wherein the static coolant reservoir is provided with jet pipes for supplying coolant to the reservoir and which are directed in a direction opposite to the direction of bending of the fluid intake tube entrance end and which are situated below the fluid level in the reservoir.

4. A device according to claim 1 wherein a pump is arranged in a fluid line from the coolant collector via a cooling device to the static coolant reservoir.

5. A device according to claim 4 wherein the pump has a capacity which exceeds the fluid amount normally used by all molds together, said static coolant reservoir being provided with an overflow which determines the coolant level.

6. A device according to claim 1 as applied for manufacturing corrugated plastic tube.

7. A device for cooling mold halves for manufacturing plastic tube, more particularly corrugated plastic tube, the mold halves being caused to travel by means of two adjacent endless chains circulating in a horizontal plane such that over adjoining parallel straight away portions of the chain path complemental mold halves, one on each chain, move along with a plastic tube issuing from an extruder so as to shape the tube each mold has vertical intake and discharge fluid tubes in communication with a coolant cavity in the mold, said molds being arranged for horizontal travel in a closed loop, a static coolant reservoir positioned above said molds, and the fluid intake tube of each mold being shaped as a siphon tube and being positioned such that the entrance end thereof passes over the edge of the static reservoir and in communication with the coolant in said static reservoir, a static coolant collector positioned below the molds and in communication with the mold fluid discharge tubes, so that by siphon action coolant from said static coolant reservoir passes through the intake tubes through the molds and through the discharge tubes and is discharged in the static coolant collector.

* * * * *